(12) United States Patent
Lan

(10) Patent No.: US 10,200,316 B2
(45) Date of Patent: Feb. 5, 2019

(54) INTERACTIONS BASED ON INSTANT MESSAGING

(71) Applicant: TENCENT TECHNOLOGY (SHENZHEN) COMPANY LIMITED, Shenzhen (CN)

(72) Inventor: Jun Lan, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 487 days.

(21) Appl. No.: 14/882,860

(22) Filed: Oct. 14, 2015

(65) Prior Publication Data

US 2016/0043972 A1  Feb. 11, 2016

Related U.S. Application Data

(63) Continuation of application No. PCT/CN2014/075362, filed on Apr. 15, 2014.

(30) Foreign Application Priority Data

Apr. 16, 2013 (CN) .......................... 2013 1 0130801

(51) Int. Cl.
*G06F 15/16* (2006.01)
*H04L 12/58* (2006.01)
*G06Q 10/10* (2012.01)

(52) U.S. Cl.
CPC ........... *H04L 51/04* (2013.01); *G06Q 10/107* (2013.01); *H04L 51/046* (2013.01); *H04L 51/32* (2013.01)

(58) Field of Classification Search
CPC ....... H04L 51/04; H04L 51/32; H04L 51/046; G06Q 10/107
See application file for complete search history.

(56) References Cited

U.S. PATENT DOCUMENTS 9,002,858 B1 *  4/2015  Dassa ................ G06Q 30/0202
                                                      705/319
9,207,832 B1 * 12/2015  Khouri ................... G06Q 10/10
(Continued)

FOREIGN PATENT DOCUMENTS

CN    101262497 A     9/2008
CN    101425093 A     5/2009
(Continued)

OTHER PUBLICATIONS

Chinese Office Action for Application No. 2013101308015 dated Oct. 28, 2016, and an English concise explanation of relevance thereof.

(Continued)

*Primary Examiner* — Krisna Lim
(74) *Attorney, Agent, or Firm* — Harness, Dickey & Pierce, P.L.C.

(57) ABSTRACT

Interactions based on Instant Messaging (IM) are provided, where an IM client of a user terminal device is configured with a microblog entrance related to IM tips, the IM client obtains IM tips data from an IM server, invokes the microblog entrance in response to an operation instruction of a user, obtains from a microblog server microblog data associated to the IM tips data, generates a microblog box and presents the microblog data on the microblog box. The methods can improve efficiencies of interactions.

18 Claims, 6 Drawing Sheets

(56) References Cited

U.S. PATENT DOCUMENTS

| | | | |
|---|---|---|---|
| 2011/0196933 A1* | 8/2011 | Jackson | G06Q 10/107 709/206 |
| 2011/0238758 A1 | 9/2011 | Liang et al. | |
| 2012/0072835 A1* | 3/2012 | Gross | G06Q 10/10 715/243 |
| 2013/0091234 A1* | 4/2013 | Ku | H04L 51/04 709/206 |
| 2013/0091306 A1 | 4/2013 | Daunmu et al. | |
| 2014/0317207 A1* | 10/2014 | Ji | H04L 51/046 709/206 |

FOREIGN PATENT DOCUMENTS

| | | |
|---|---|---|
| CN | 102137058 A | 7/2011 |
| CN | 102447689 A | 5/2012 |
| CN | 102810101 A | 12/2012 |
| CN | 102868590 A | 1/2013 |

OTHER PUBLICATIONS

International Search Report for Application No. PCT/CN2014/075362 dated Jul. 21, 2014.
International Preliminary Report for Application No. PCT/CN2014/075362 dated Oct. 29, 2015.

* cited by examiner

INTERACTIONS BASED ON INSTANT MESSAGING

CROSS-REFERENCE TO RELATED APPLICATIONS

This application is a continuation of International Application No. PCT/CN2014/075362, filed Apr. 15, 2014. This application claims the benefit and priority of Chinese Application No. 201310130801.5, filed Apr. 16, 2013. The entire disclosures of each of the above applications are incorporated herein by reference.

FIELD

The present disclosure relates to a field of Information Technology (IT), and to interactions based on Instant Messaging (IM).

BACKGROUND

This section provides background information related to the present disclosure which is not necessarily prior art.

With the rapid development of computer and network technologies, the Internet and Instant Messaging (IM) are becoming more relevant in daily lives.

Presently, an IM client of a user terminal has a function of providing news tips. Where a backend system for providing news tips may push contents of the news tips to the IM client, the IM client may pop up a news tips box to present the contents of the news tips and a user may publish a microblog (i.e., Twitter) to share the contents of the news tips through operations on the news tips box.

However, in the above method, the contents of the news tips are duplicated to generate contents of a microblog to be shared so that there will be a plurality of microblogs with repetitive content of the news tips no matter at a microblog server or on a microblog webpage, which results in data redundancy. In addition, in such a method, forwarding and commenting on the microblog cannot be widely spread, and thus, interaction efficiency is limited.

SUMMARY

This section provides a general summary of the disclosure, and is not a comprehensive disclosure of its full scope or all of its features.

A method of interactions based on IM is provided, wherein an IM client of a user terminal device is configured with a microblog entrance related to IM tips. The method includes obtaining, by the IM client, IM tips data from an IM server, invoking, by the IM client, the microblog entrance in response to an operation instruction of a user, obtaining, by the IM client, from a microblog server microblog data associated to the IM tips data, and generating a microblog box and presenting the microblog data on the microblog box.

An apparatus of interactions based on IM is provided, wherein the apparatus is loaded on an IM client of a user terminal device. The IM client is configured with a microblog entrance related to IM tips and the apparatus includes a memory and a processor in communication with the memory storing a set of instructions executable by the processor. The set of instructions are to direct the processor to perform the act of obtaining IM tips data from an IM server, when the IM client invokes the microblog entrance in response to an operation instruction of a user, obtaining from a microblog server microblog data associated to the IM tips data, and generating a microblog box and presenting the microblog data on the microblog box.

A system of interactions based on IM is provided. The system includes a tips data edit apparatus, an IM terminal device, and a microblog server, wherein the tips data edit apparatus edits IM tips data and transmit the IM tips data to the microblog server, the microblog server generates microblog data associated with the IM tips data, and the IM terminal device, when an IM client invokes a microblog entrance related to IM tips in response to an operation instruction of a user, obtains the microblog data from the microblog server, generates a microblog box, and presents the microblog data on the microblog box.

An IM terminal device is provided. The IM terminal device includes a tips box activation unit and a microblog box activation unit, wherein the tips box activation unit obtains IM tips data from an IM server, presents an IM tips box configured with a microblog entrance related to IM tips, and presents the IM tips data on the IM tips box. The microblog box activation unit, when an IM client invokes the microblog entrance in response to an operation instruction of a user on the IM tips box, obtains from a microblog server microblog data associated to the IM tips data, generates a microblog box, and presents the microblog data on the microblog box.

A user terminal device is provided, which includes one or more processors and one or more memories, wherein an IM client of the user terminal device is configured with a microblog entrance related to IM tips, the one or more memories store instructions executable for the one or more processors. When the instructions are executed, the one or more processors enable the IM client to perform the process of obtaining IM tips data from an IM server, invoking the microblog entrance in response to an operation instruction of a user, obtaining from a microblog server microblog data associated to the IM tips data obtained, and generating a microblog box and presenting the microblog data on the microblog box.

A non-transitory machine-readable storage medium is provided, which stores instructions to cause a machine to execute the above method.

Further areas of applicability will become apparent from the description provided herein. The description and examples in this summary are intended for purposes of illustration and are not intended to limit the scope of the present disclosure.

DRAWINGS

The drawings described herein are for illustrative purposes of selected embodiments and not all possible implementations, and are not intended to limit the scope of the present disclosure.

FIG. 8-1 is a diagram illustrating a graphic interface of an IM client's tool panel configured with a microblog entrance according to various embodiments;

FIG. 8-2 is a diagram illustrating a graphic interface of an IM client's tool panel configured with a microblog entrance according to various embodiments.

Corresponding reference numerals indicate corresponding parts throughout the several views of the drawings.

DETAILED DESCRIPTION

Figure 1:
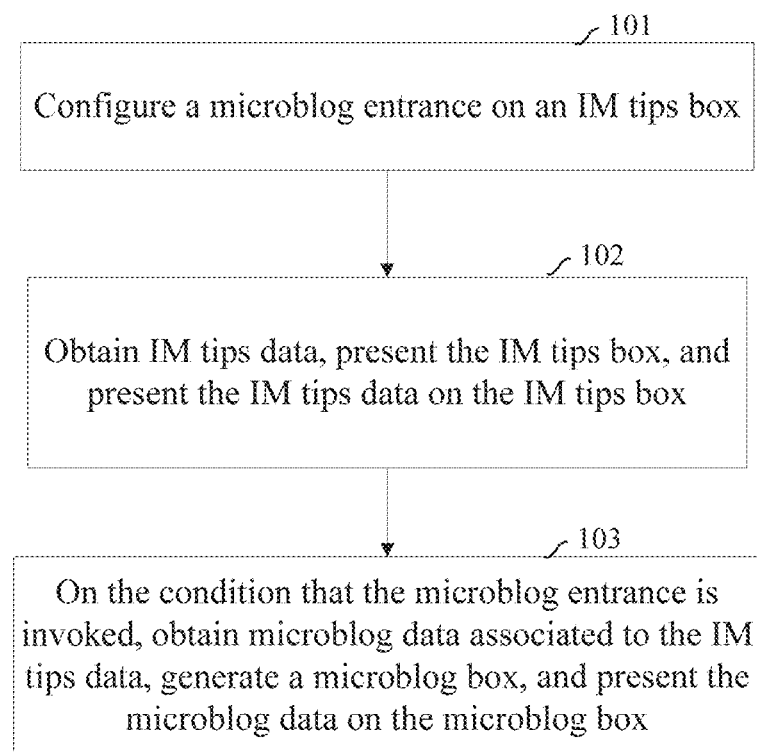
FIG. 1 is a flow diagram of a method of IM-based interactions according to various embodiments.

Example embodiments will now be described more fully with reference to the accompanying drawings.

The terms used in this specification generally have their ordinary meanings in the art, within the context of the disclosure, and in the context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative, and in no way limits the scope and meaning of the disclosure or of any exemplified term. Likewise, the disclosure is not limited to various embodiments given in this specification.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

As used herein, the terms "comprising," "including," "having," "containing," "involving," and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more processes within a method may be executed in different order (or concurrently) without altering the principles of the present disclosure.

As used herein, the term "module" or "unit" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term "module" or "unit" may include memory (shared, dedicated, or group) that stores code executed by the processor.

The term "code", as used herein, may include software, firmware, and/or microcode, and may refer to programs, routines, functions, classes, and/or objects. The term "shared", as used herein, means that some or all code from multiple modules may be executed using a single (shared) processor. In addition, some or all code from multiple modules may be stored by a single (shared) memory. The term "group", as used herein, means that some or all code from a single module may be executed using a group of processors. In addition, some or all code from a single module may be stored using a group of memories.

According to various embodiments, an IM client obtains IM tips data from an IM server and, when a microblog entrance related to IM tips is invoked, the IM client obtains microblog data associated with the IM tips data from a microblog server, generates a microblog box, and presents the microblog data on the microblog box.

According to various embodiments the microblog entrance related to IM tips may be configured on an IM tips box for presenting the IM tips data. After obtaining the IM tips data, the IM client further presents the IM tips box to present the IM tips data thereon. According to various embodiments, the microblog entrance related to IM tips may be configured on the IM client's tool panel. When there is no prior microblog entrance on the tool panel, the IM-tips-related microblog entrance may be added to the tool panel. Alternatively, when a microblog entrance on the tool panel is already in existence, the existing microblog entrance may be replaced by the IM-tips-related microblog entrance or the IM-tips-related microblog entrance may be added as a sub-entrance under the existing microblog entrance.

FIG. 1 is a flow chart of a method of IM-based interactions according to various embodiments. The method includes the following processes.

Block 101: A microblog entrance is configured on an IM tips box for presenting IM tips data which is prompted by an IM client. The IM tips box is a notification mode of Instant Messenger (i.e., the IM client). When an IM user is online, the IM client may activate a message tips box for presenting pictures and texts at any time. The message tips box may be popped up at the lower right corner of the screen, which will not disappear until the user initially clicks on it. Contents of IM tips data presented on the IM tips box may relate to various aspects including news, current politics, new products released by companies, system messages, etc. The microblog entrance may be configured on the IM tips box through various interface design methods, e.g., various interface elements such as a text box, a button, a pull-down menu, etc., and may be configured on the IM tips box as the microblog entrance.

Block 102: The IM client obtains IM tips data, presents an IM tips box, and presents the IM tips data on the IM tips box. The IM client of an IM terminal device obtains the IM tips data from an IM server, presents the IM tips box on the IM terminal device, and presents the IM tips data on the IM tips box. The IM tips data may include information about news, current politics, new products released by companies, system messages, etc.

Block 103: The IM client determines whether a microblog entrance on the IM tips box is invoked, and if it is invoked, the IM client issues a request to a microblog server for microblog data associated to the IM tips data to obtain the microblog data, generates a microblog box, and presents the microblog data on the microblog box.

A news microblog subsystem may be established at a microblog backend (i.e., the microblog server) and the news microblog subsystem may generate microblog data according to the IM tips data. For example, the news microblog subsystem may generate a microblog topic based on the title of a news tips box (i.e., a kind of IM tips box) and, if there is a picture in the news tips box, the picture may be presented as a picture of the microblog, and the summary of the news tips box may be taken as the content of the microblog.

Table 1 shows a data structure table of the microblog data associated with the tips data which are news tips data.

TABLE 1

| Microblog data associated to tips data | |
| --- | --- |
| PK | News ID |
| | Microblog ID |
| | News Title |
| | Picture Link |
| | News Description |
| | Webpage Link |

According to various embodiments of the present disclosure, the news microblog subsystem stores all data related to the IM tips box (including the current data and historical data), which may include news IDs, news titles, news descriptions, picture links, news links, microblog IDs corresponding to news, etc.

When the IM client of the IM terminal device determines that the microblog entrance on the IM tips box is invoked, the IM client issues a request for the microblog data associated to the IM tips data to the news microblog subsystem to obtain the microblog data, and further generates a microblog box to present the microblog data thereon.

According to various embodiments, a microblog entrance may be configured on the tool panel of the IM client. The IM client determines whether the microblog entrance on the tool panel is invoked, and if it is invoked, the IM client issues a request for the microblog data associated to the IM tips data to the news microblog subsystem to obtain the microblog data, generates a microblog box, and presents the microblog data on the microblog box.

According to various embodiments, in Block 103, the requested microblog data associated with the IM tips data includes a microblog account responsible for publishing a microblog associated with the IM tips data currently obtained, a content of the microblog associated with the IM tips data and an ID list of historical microblogs associated to IM tips data that have been published. A process of presenting the microblog data on the microblog box includes presenting the microblog account in a user bar of the microblog box, presenting the ID list of historical microblogs associated with IM tips data that have been published in a navigation bar of the microblog box, and presenting the content of the microblog associated with the IM tips data currently obtained in a microblog bar of the microblog box.

According to various embodiments, in Block 103, the requested microblog data associated with the IM tips data includes a microblog account responsible for publishing a microblog associated with the IM tips data and content of the microblog associated with the IM tips data. A process of presenting the microblog data on the microblog box includes presenting the microblog account in a user bar of the microblog box and presenting the content of the microblog associated to the current IM tips data in a microblog bar of the microblog box.

When a user clicks on a button in the IM tips box which is taken as the microblog entrance, a microblog box is popped up, in which a webkit page is embedded. The webkit page includes three modules: (1) a user bar which presents a microblog account of a news official party, (2) a navigation bar which lists historical news microblogs, and (3) a microblog bar which presents the microblog published by the news official party, adds multiple pictures and detailed description of the current news, and provides interaction functions of forwarding and/or making comments on the microblog.

According to various embodiments, the method further includes a process of obtaining information about forwarding and/or making comments on the microblog associated with the currently-obtained IM tips data and presenting the information about forwarding and/or making comments on the microblog bar in the microblog box.

The user may receive tips and browse the microblog through various smart terminal devices, including a functional cell phone, a smart cell phone, a palm computer, a tablet computer, a personal digital assistant (PDA), etc.

In the above examples, the browser used to present the page may include browsers such as Internet Explorer, Firefox, Safari, Opera, Chrome, GreenBrowser, etc.

Those skilled in the art will recognize that the implementation of the above examples is not limited to using the above various browsers. Any application (App) capable of presenting files of a webpage server or a file system and enabling interactions between the user and the files could be applicable to the examples. Such application may be various common browsers or any other application that owns a webpage browsing function.

Figure 2:
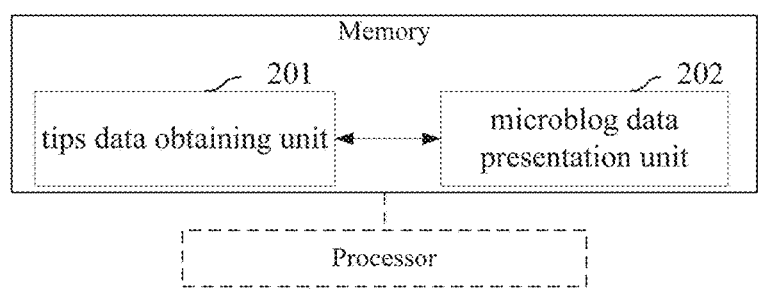
FIG. 2 is a diagram illustrating a structure of an apparatus of IM-based interactions according to various embodiments.

Based on the above examples, the present disclosure also provides an apparatus of IM-based interactions. FIG. 2 is a diagram illustrating a structure of an apparatus of IM-based interactions according to various embodiments, and the apparatus is located at the IM terminal device. The apparatus includes a tips data obtaining unit 201 and a microblog data presentation unit 202.

The tips data obtaining unit 201 obtains IM tips data from an IM server. The microblog data presentation unit 202, when a microblog entrance related to IM is invoked, issues a request for microblog data associated with the IM tips data to a microblog server to obtain the microblog data, generate a microblog box, and present the microblog data on the microblog box.

According to various embodiments of the present disclosure, the microblog data presentation unit 202 may include a microblog entrance configuration subunit, a tips data presentation subunit, and a microblog data presentation subunit. The microblog entrance configuration configures a microblog entrance on an IM tips box of an IM client. The tips data presentation subunit obtains IM tips data from the IM server, presents the IM tips box, and presents the IM tips data on the microblog box. The microblog data presentation subunit, when the microblog entrance on the IM tips box is invoked, issues a request for microblog data associated with the IM tips data to a microblog server to obtain the microblog data, generate a microblog box, and present the microblog data on the microblog box.

According to various embodiments, the microblog data presentation unit 202 may include a microblog entrance configuration subunit and a microblog data presentation subunit. The microblog entrance configuration subunit configures a microblog entrance on a tool panel of an IM client.

The microblog data presentation subunit, when the microblog entrance on the tool panel of the IM client is invoked, issues a request for microblog data associated with the IM tips data to a microblog server to obtain the microblog data, generates a microblog box, and presents the microblog data on the microblog box.

Figure 3:
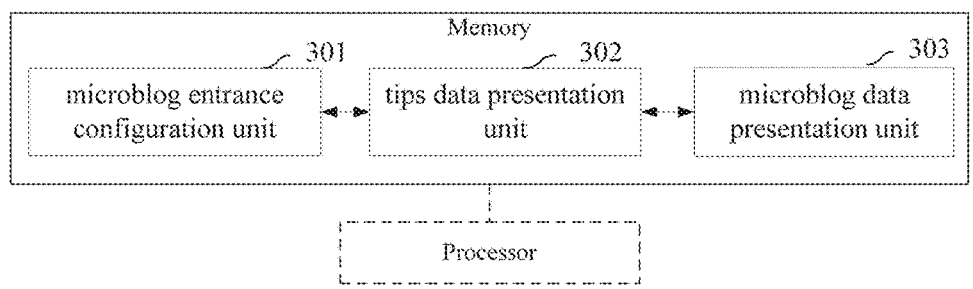
FIG. 3 is a diagram illustrating a structure of an apparatus of IM-based interactions according to various embodiments.

FIG. 3 is a diagram illustrating a structure of an apparatus of IM-based interactions according to various embodiments of the present disclosure. The apparatus is located at the IM terminal device. The apparatus includes a microblog entrance configuration unit 301, a tips data presentation unit 302, and a microblog data presentation unit 303. The microblog entrance configuration unit 301 configures a microblog entrance on an IM tips box of an IM client. The tips data presentation unit 302 obtains IM tips data from an IM server, presents an IM tips box, and presents the IM tips data on the IM tips box. The microblog data presentation unit 303 determines whether the microblog entrance on the IM tips box is invoked and, if it is invoked, issues a request for microblog data associated with the IM tips data to a microblog server to obtain the microblog data, generates a microblog box, and presents the microblog data on the microblog box.

According to various embodiments, the microblog entrance configuration unit 301 further configures a microblog entrance on a tool panel of the IM client. The microblog data presentation unit 303 further determines whether the microblog entrance on the tool panel of the IM client is invoked and, if it is invoked, issues a request for microblog data associated to the IM tips data to the microblog server to obtain the microblog data, generates a microblog box, and presents the microblog data on the microblog box.

According to various embodiments, the microblog data presentation unit 303 issues to the microblog server a request for a microblog account for publishing a microblog associated with the currently-obtained IM tips data, a content of the microblog, and an ID list of historical microblogs associated with IM tips data that have been published, presents the microblog account on a user bar of the microblog box, presents the ID list on a navigation bar of the microblog box, and presents the content of the microblog associated to the currently-obtained IM tips data on a microblog bar of the microblog box. According to various embodiments, the microblog data presentation unit 303 issues to the microblog server a request for a microblog account for publishing a microblog associated with the current IM tips data and a content of the microblog, presents the microblog account on a user bar of the microblog box, and presents the content of the microblog associated with the current IM tips data on a microblog bar of the microblog box.

According to various embodiments of the present disclosure, the microblog data presentation unit 303 further obtains information about forwarding and/or making comments on the microblog associated with the current IM tips data, and presents the information about forwarding and/or making comments on the microblog bar of the microblog box.

Figure 4:
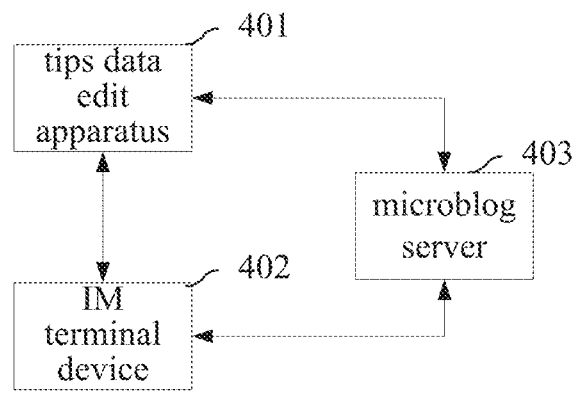
FIG. 4 is a diagram illustrating a structure of a system of IM-based interactions according to various embodiments.

Based on the above examples, a system of IM-based interactions is provided. FIG. 4 is a diagram illustrating a structure of a system of IM-based interactions according to various embodiments of the present disclosure. The system includes a tips data edit apparatus 401, an IM terminal device 402, and a microblog server 403. According to various embodiments of the present disclosure, the tips data edit apparatus 401 is located at an IM server and an IM client is loaded on the IM terminal device 402.

The tips data edit apparatus 401 edits IM tips data and transmits the IM tips data to the microblog server 403. The microblog server 403 generates microblog data associated with the IM tips data. The IM terminal device 402 obtains the IM tips data from the tips data edit apparatus 401 when a microblog entrance related to IM tips is invoked to issue a request for microblog data associated with the IM tips data to the microblog 403 to obtain the microblog data, to generate a microblog box, and to present the microblog data on the microblog box.

According to various embodiments, the microblog entrance is configured on an IM tips box. According to various other embodiments, the microblog entrance is configured on a tool panel of the IM client. When the microblog entrance is configure in the IM tips box, the IM terminal device 402 further presents the IM tips box and presents the IM tips data on the IM tips box. The IM terminal device 402 obtains the IM tips data from the tips data edit apparatus 401, presents the IM tips box to present the IM tips data thereon, and determines whether the microblog entrance in the IM tips box is invoked and, if it is invoked, issues a request for microblog data associated with the IM tips data to the microblog server 403 to obtain the microblog data, generates a microblog box, and presents the microblog data on the microblog box.

According to various embodiments, when the microblog entrance is configured on the tool panel of the IM client, the IM terminal device 402 determines whether the microblog entrance on the tool panel is invoked and, if it is invoked, issues a request for microblog data associated to the IM tips data to the microblog server 403 to obtain the microblog data, generates a microblog box, and presents the microblog data on the microblog box.

According to various embodiments, the IM terminal device 402 issues a request to the microblog server 403 for a microblog account responsible for publishing a microblog associated with the IM tips data currently obtained, a content of the microblog and an ID list of historical microblogs associated with IM tips data that have been published, presents the microblog account on a user bar of the microblog box, presents the ID list on a navigation bar of the microblog box, and presents the content of the microblog associated with the currently-obtained IM tips data on a microblog bar of the microblog box. According to various embodiments, the IM terminal device 402 issues to the microblog server 403 a request for a microblog account for publishing a microblog associated to the currently-obtained IM tips data and a content of the microblog, presents the microblog account on a user bar of the microblog box, and presents the content of the microblog associated to the currently-obtained IM tips data on a microblog bar of the microblog box.

According to various embodiments of the present disclosure, the microblog server 403 further stores historical IM tips data and associated historical microblog data.

Figure 5:
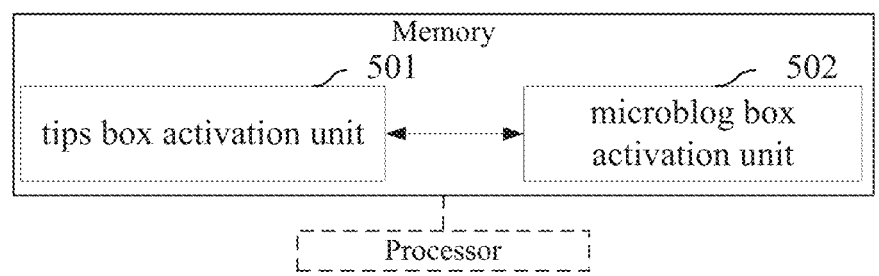
FIG. 5 is a diagram illustrating a structure of an IM terminal device according to various embodiments.

Based on the above examples, an IM terminal device is provided. FIG. 5 is a diagram illustrating a structure of an IM terminal device according to various embodiments. The IM terminal device includes a tips box activation unit 501 and a microblog box activation unit 502. The tips box activation unit 501 obtains IM tips data from an IM server, presents an IM tips box, and presents the IM tips data on the IM tips box, where a microblog entrance is configured in the IM tips box. The microblog box activation unit 502 determines whether the microblog box in the IM tips box is invoked and, if it is invoked, issues a request to a microblog server for microblog data associated with the IM tips data to obtain the microblog data, generates a microblog box, and presents the microblog data on the microblog box.

According to various embodiments of the present disclosure, the IM terminal device further includes a microblog entrance configured on a tool panel of an IM client. The microblog box activation unit 502 further determines whether the microblog entrance on the tool panel of the IM client is invoked and, if it is invoked, issues to the microblog server a request for microblog data associated with the IM tips data to obtain the microblog data, generates a microblog box, and presents the microblog data on the microblog box.

The above examples may be applied to various scenarios. For example, the examples may be applied to a scenario having a news tips box (i.e., a kind of IM tips box), a news microblog subsystem may be established at a microblog backend (i.e., the microblog server), and the subsystem may generate associated microblog data according to the IM tips data. The subsystem may store all data related to tips boxes popped up by the IM client, including a news ID, a news title, a news description, a picture link, a news link, a microblog ID corresponding to a news, etc. The subsystem may provide two protocols for the frontend (i.e., the IM client of the IM terminal device) in order to implement data retrieving, for retrieving ID list of news and for retrieving materials of news microblogs, respectively.

Before the tips data edit apparatus in the IM server pushes news tips, the tips data edit apparatus generates a microblog about the news tips using a news official microblog account and uploads news materials such as texts, pictures, or the like to the news microblog subsystem of the microblog server. Upon success of uploading the news materials, data of the current news is added to the news microblog subsystem. The tips data edit apparatus then generates the news tips and transmits the same to the IM client of the IM terminal device, which prompts a news tips box. One webpage may be provided for the whole procedure to implement unified edit management.

Figure 6:
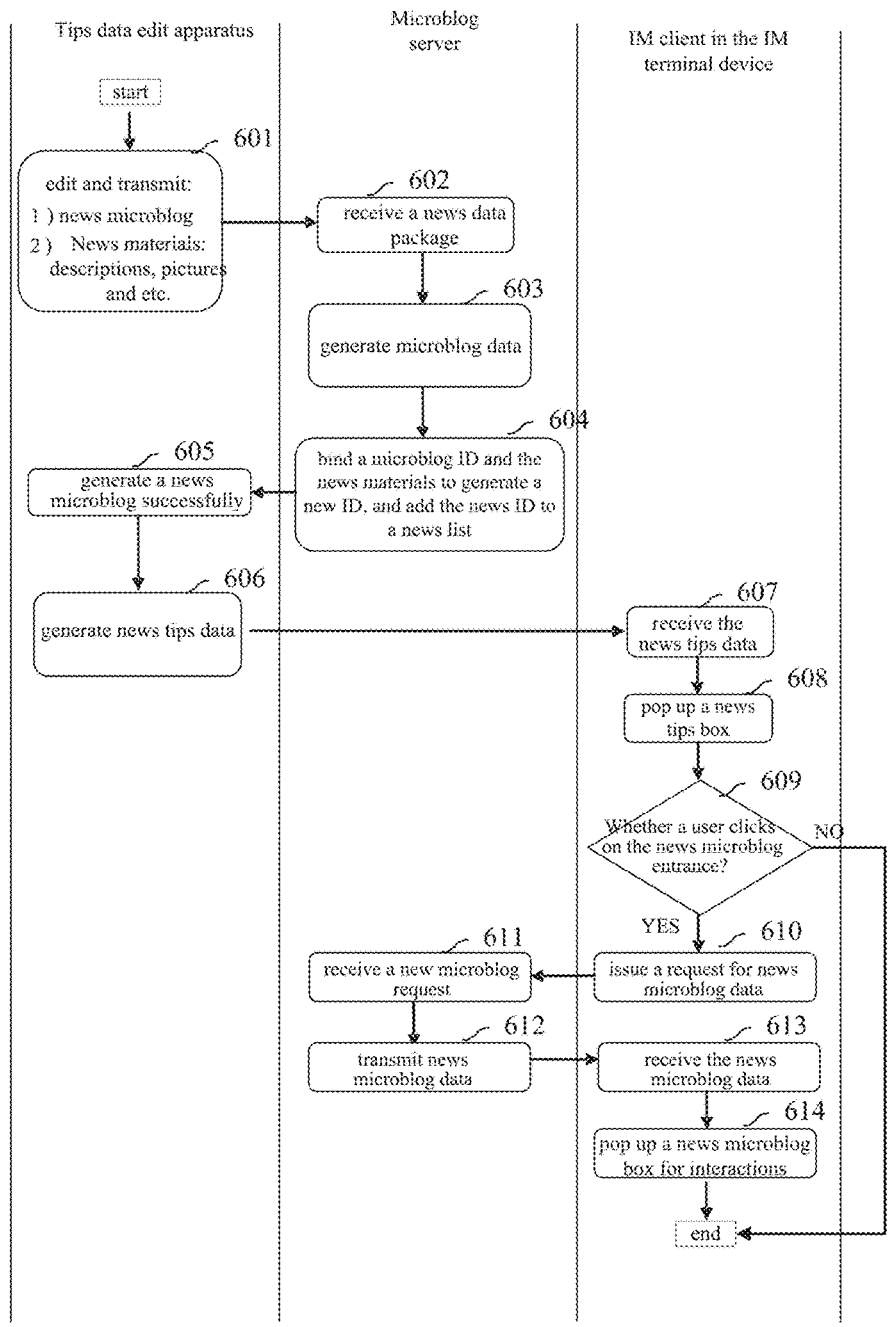
FIG. 6 is a flow diagram of interaction processes based on IM according to various embodiments.

FIG. 6 is a flow diagram illustrating a process of IM-based interactions according to various embodiments of the present disclosure. The process is as follows.

In Blocks 601-606, the tips edit apparatus edits content of a news microblog and materials of the news microblog such as news descriptions and pictures, etc., packs all information into a news data package, and transmits the same to the microblog server. The microblog server retrieves the content of the news microblog from the news data package, generates news microblog data based on the content of the news microblog, binds the ID of the news microblog and the news materials together to generate a news ID, and adds the news ID into a news list which stores historical data for spreading news. The microblog server notifies the tips data edit apparatus of completion of its process and the tips data edit apparatus then generates news tips data and pushes the news tips data to the IM client of the IM terminal device.

In Blocks 607-614, the IM client receives the news tips data, prompts a news tips box, and determines whether the user has clicked on a news microblog entrance on the news tips box and, if the user has not clicked on it, ends the current process. If the user has clicked on a news microblog entrance on the news tips box, the IM client transmits a news microblog request to the microblog server, the microblog server provides news microblog data to the IM client in response to the news microblog request, the IM client prompts a news microblog box, presents the news microblog data on the news microblog box, and implements interaction functions for the news microblog data, such as forwarding and/or making comments on the news microblog data or the like, according to the user's interaction operations on the news microblog box.

Figure 7:
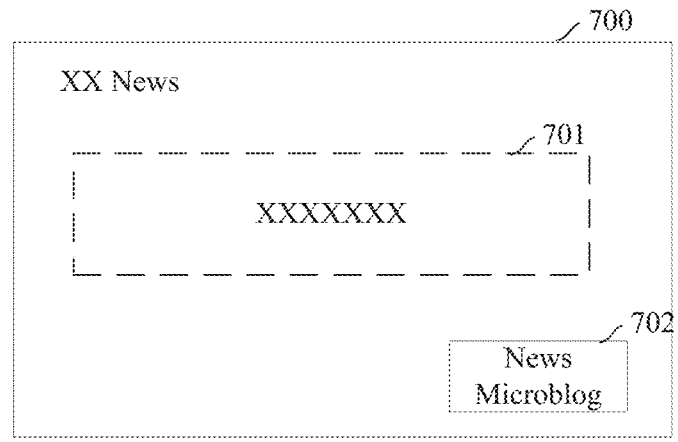
FIG. 7 is a diagram illustrating a graphic interface of a news tips box configured with a microblog entrance according to various embodiments.

FIG. 7 is a diagram illustrating a graphic interface of a news tips box configured with a microblog entrance according to various embodiments. A news tips box 700 is prompted, in which the news tips data 701 is presented and a microblog entrance 702 is provided.

Figures 1, 8:
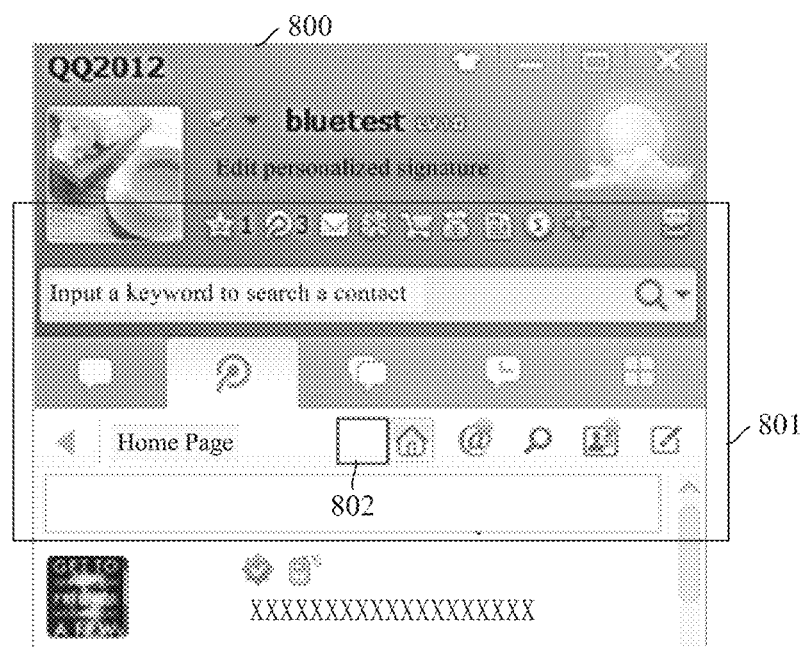
Figures 2, 8:
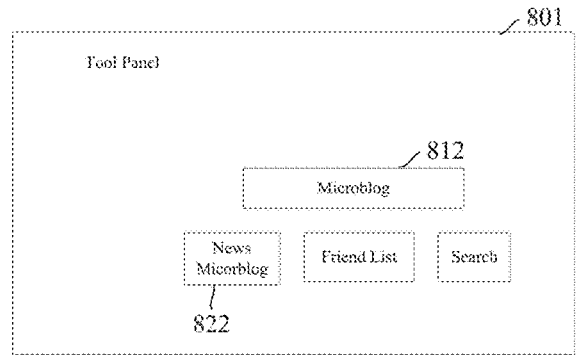

FIGS. 8-1 and 8-2 are diagrams illustrating graphic interfaces of an IM client's tool panel configured with a microblog entrance according to various embodiments of the present disclosure. On the condition that there is not any microblog entrance on the tool panel of the IM client, the microblog entrance related to IM tips may be added to the tool panel. As shown in FIG. 8-1, a microblog entrance 802 is configured on the tool panel 801 of the IM client 800. Alternatively, on the condition that there is an existing microblog on the tool panel of the IM client, the microblog entrance related to IM tips may be added as a sub-entrance under the existing microblog entrance. As shown in FIG. 8-2, there is an existing microblog entrance 812 on the tool panel 801, and a new microblog entrance 822 which is related to IM tips is added as a sub-entrance under the microblog entrance 812.

According to various embodiments of the present disclosure, there may be some variations in configuration form and position of the microblog entrance, which will not be discussed herein.

Figure 9:
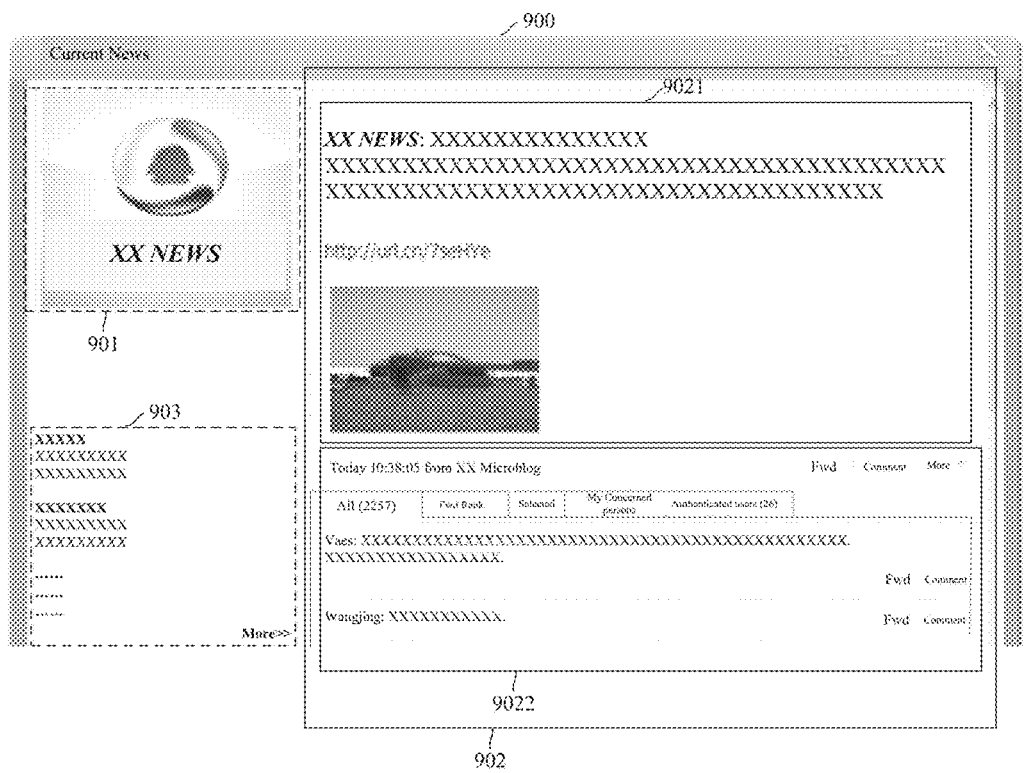
FIG. 9 is a diagram illustrating a graphic interface of a microblog box presented in response to invoking of the microblog entrance according to various embodiments.

FIG. 9 is a diagram illustrating a graphic interface of a microblog box presented in response to invoking the microblog entrance according to various embodiments of the present disclosure. As shown in FIG. 9, in the news microblog box 900, a news official microblog account "XX News" is presented in the user bar 901, the news microblog data associated with the currently-obtained IM tips data is presented on the microblog bar 902 in which the content of the news microblog is presented in area 9021, and information about forwarding and making comments on the new microblog data is presented in area 9022, and the ID list of historical microblogs associated with IM tips data that have been published is presented in the navigation bar 903.

The method provided in the above examples may be implemented in various ways. For example, the method may be implemented as a plug-in program installed in a browser of a terminal device through an API, or may be implemented as an encapsulated application program which is provided to be downloaded by the user. On the condition that the method is implemented as the plug-in program, it may be implemented as various plug-in programs such as ocx, dll, cab, Flash plug-in, RealPlayer plug-in, MMS plug-in, MIDI staff plug-in, ActiveX plug-in, etc.

The method provided by the above examples may be implemented as instructions or instruction sets stored in various storage mediums including, but not limited to, a floppy disk, an optical disk, DVD, a hard disk, a flash memory, and the storage medium based on Nand flash such as a U disk, a CF card, an SD card, an MMC card, an SM card, a memory stick, an xD card, or the like.

Furthermore, various embodiments can be implemented on various terminals and can be used across platforms and across terminals, which has a wide application range.

In the above examples, the promotion of IM tips and the microblog can be combined together to implement a commenting and sharing platform, where after the news official microblog account publishes its original microblog, there will not be any microblog with repetitive contents at the backend of microblog (i.e., the microblog server), so that redundant data at the microblog server can be reduced, the user's interaction efficiency can be improved, and processing resources occupied by the user's terminal device and the microblog server can be saved. In addition, the user is able to browser recent news information at the same time so that it is convenient for the user to keep forwarding and/or making comments for historical news. As a result, the interaction efficiency is further improved, and the processing resources are further saved.

The systems, apparatuses, and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The description will be made as to the various examples in conjunction with the accompanying drawings in FIGS. 1-9. It should be understood that examples described herein are merely intended to explain the present disclosure, but not intended to limit the present disclosure.

Examples of terminal devices or mobile device or mobile terminals that can be used in accordance with various embodiments include, but are not limited to, a Personal Computer (PC), a tablet PC (including, but not limited to, Apple iPad and other touch-screen devices running Apple iOS, Microsoft Surface and other touch-screen devices running the Windows operating system, and tablet devices running the Android operating system), a mobile phone, a smartphone (including, but not limited to, an Apple iPhone, a Windows Phone and other smartphones running Windows Mobile or Pocket PC operating systems, and smartphones running the Android operating system, the Blackberry operating system, or the Symbian operating system), an e-reader (including, but not limited to, Amazon Kindle and Barnes & Noble Nook), a laptop computer (including, but not limited to, computers running Apple Mac operating system, Windows operating system, Android operating system and/or Google Chrome operating system), or an on-vehicle device running any of the above-mentioned operating systems or any other operating systems, all of which are well known to one skilled in the art.

A machine-readable storage medium is also provided, which stores instructions to cause a machine such as a computing device to execute one or more methods as described herein. A system, apparatus, or terminal device having a storage medium that stores machine-readable program codes for implementing functions of any of the above examples and that may make the system or the apparatus or the terminal device (or CPU or MPU) read and execute the program codes stored in the storage medium.

Therefore, the apparatus shown in FIG. 2 may include a memory and a processor, where the memory stores instructions executable for the processor. The memory may include the units 201-202, and through executing the instructions read from the units 201-202, the processor can accomplish the functions of the units 201-202 as mentioned above. Therefore, an apparatus of IM-based interactions including one or more memories and one or more processors is provided, where the one or more memories store instruction units executable for the one or more processors, and the instruction units include the above units 201-202. The apparatus shown in FIG. 3 may include a memory and a processor, the memory stores instructions executable for the processor. The memory may include the units 301-303, and through executing the instructions read from the units 301-303, the processor can accomplish the functions of the units 301-303 as mentioned above. Therefore, an apparatus of IM-based interactions including one or more memories and one or more processors is provided, where the one or more memories store instruction units executable for the one or more processors, and the instruction units include the above units 301-303. The IM terminal device shown in FIG. 5 may include a memory and a processor, the memory stores instructions executable for the processor. The memory may include the units 501-502, and through executing the instructions read from the units 501-502, the processor can accomplish the functions of the units 501-502 as mentioned above. Therefore, an IM terminal device of IM-based interactions including one or more memories and one or more processors is provided, where the one or more memories store instruction units executable for the one or more processors, and the instruction units include the above units 501-502.

In this situation, the program codes read from the storage medium may implement any one of the above examples, thus the program codes and the storage medium storing the program codes are part of the technical scheme.

The storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM, and so on. Optionally, the program code may be downloaded from a server computer via a communication network.

It should be noted that, alternatively to the program codes being executed by a computer (namely a computing device), at least part of the operations performed by the program codes may be implemented by an operation system running in a computer following instructions based on the program codes to realize a technical scheme of any of the above examples.

The program codes implemented from a storage medium are written in storage in an extension board inserted in the computer or in storage in an extension unit connected to the computer. In this example, a CPU in the extension board or the extension unit executes at least part of the operations according to the instructions based on the program codes to realize a technical scheme of any of the above examples.

The above description shows several examples of the present disclosure in order to present the principle and implementation of the present disclosure, and is in no way intended to limit the scope of the present disclosure. Any modifications, equivalents, improvements, and the like made within the spirit and principle of the present disclosure should be encompassed in the scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

What is claimed is:

1. A method of interactions based on Instant Messaging (IM), wherein an IM client of a user terminal device is configured with a microblog entrance related to IM tips, and the method comprises:
   obtaining, by the IM client, IM tips data from an IM server, wherein the IM tips data includes information about at least one of news, politics ,a new product released by a company, or a system message; invoking, by the IM client, the microblog entrance in response to an operation instruction of a user;
   obtaining, by the IM client, from a microblog server microblog data associated to the IM tips data; and
   generating a microblog box and presenting the microblog data on the microblog box.

2. The method of claim 1, further comprising:
upon obtaining the IM tips data, presenting, by the IM client an IM tips box configured with the microblog entrance and presenting the IM tips data obtained on the IM tips box; and
invoking, by the IM client, the microblog entrance in response to the operation instruction of the user on the IM tips box.

3. The method of claim 1, wherein the microblog entrance is configured on a tool panel of the IM client, and the IM client invokes the microblog entrance in response to the operation instruction of the user on the tool panel.

4. The method of claim 1, wherein the microblog data comprises a microblog account for publishing a microblog associated to the IM tips data currently obtained, a content of the microblog and an identifier list of microblogs associated to historical IM tips data having been published; and a process of presenting the microblog data on the microblog box comprises: presenting the microblog account on a user bar of the microblog box, presenting the identifier list on a navigation bar of the microblog box, and presenting the content of the microblog on a microblog bar of the microblog box; or,
the microblog data comprises a microblog account for publishing a microblog associated to the IM tips data currently obtained and a content of the microblog; and a process of presenting the microblog data on the microblog box comprises: presenting the microblog account on a user bar of the microblog box, and presenting the content of the microblog on a microblog bar of the microblog box.

5. The method of claim 4, further comprising:
obtaining, by the IM client, from the microblog server information about forwarding and/or making comments on the microblog associated to the IM tips data currently obtained; and
presenting, by the IM client, on the microblog bar the information about forwarding and/or making comments on the microblog associated to the IM tips data currently obtained.

6. The method according to claim 1, wherein when the IM tips data is news tips data, the microblog data associated to the IM tips data comprises at least one of: a news ID, a news title, a news description, a picture link, a news link, or a microblog ID corresponding to the news.

7. An apparatus of interactions based on Instant Messaging (IM), wherein the apparatus is loaded on an IM client of a user terminal device, the IM client is configured with a microblog entrance related to IM tips, and the apparatus comprises a memory, a processor in communication with the memory storing a set of instructions executable by the processor, the set of instructions are to direct the processor to perform acts of:
obtain IM tips data from an IM server, wherein the IM tips data includes information about at least one of news, politics, a new product released by a company, or a system message; and
when the IM client invokes the microblog entrance in response to an operation instruction of a user, obtain from a microblog server microblog data associated to the IM tips data, generate a microblog box and present the microblog data on the microblog box.

8. The apparatus of claim 7, wherein the set of instructions are further to direct the processor to perform acts of: configure the microblog entrance on an IM tips box;

obtain the IM tips data from the IM server, present the IM tips box and present the IM tips data on the IM tips box; and
when the IM client invokes the microblog entrance in response to the operation instruction of the user on the IM tips box, obtain from the microblog server the microblog data, generate the microblog box and present the microblog data on the microblog box.

9. The apparatus of claim 7, wherein the set of instructions are further to direct the processor to perform acts of: configure the microblog entrance on a tool panel of the IM client; and
when the IM client invokes the microblog entrance in response to the operation instruction of the user on the tool panel, obtain from the microblog server the microblog data, generate the microblog box and present the microblog data on the microblog box.

10. The apparatus of claim 7, wherein the microblog data comprises a microblog account for publishing a microblog associated to the IM tips data currently obtained, a content of the microblog and an identifier list of microblogs associated to historical IM tips data having been published; and the set of instructions are further to direct the processor to perform acts of: present the microblog account on a user bar of the microblog box, present the identifier list on a navigation bar of the microblog box, and present the content of the microblog on a microblog bar of the microblog box; or,
the microblog data comprises a microblog account for publishing a microblog associated to the IM tips data currently obtained and a content of the microblog; and the set of instructions are further to direct the processor to perform acts of: present the microblog account on a user bar of the microblog box, and present the content of the microblog on a microblog bar of the microblog box.

11. The apparatus of claim 10, wherein the set of instructions are further to direct the processor to perform acts of: obtain from the microblog server information about forwarding and/or making comments on the microblog associated to the IM tips data currently obtained, and present on the microblog bar the information about forwarding and/or making comments on the microblog associated to the IM tips data currently obtained.

12. The apparatus according to claim 7, wherein when the IM tips data is news tips data, the microblog data associated to the IM tips data comprises at least one of: a news ID, a news title, a news description, a picture link, a news link, or a microblog ID corresponding to the news.

13. A system of interactions based on Instant Messaging (IM), comprising a tips data edit apparatus, an IM terminal device and a microblog server, wherein
the tips data edit apparatus is to edit IM tips data and transmit the IM tips data to the microblog server, wherein the IM tips data includes information about at least one of news, politics, a new product released by a company, or a system message;
the microblog server is to generate microblog data associated to the IM tips data; and
the IM terminal device is to, when an IM client invokes a microblog entrance related to IM tips in response to an operation instruction of a user, obtain the microblog data from the microblog server, generate a microblog box and present the microblog data on the microblog box.

14. The system of claim 13, wherein the microblog entrance is configured on an IM tips box; and the IM terminal device is further to present the IM tips box, present the IM tips data on the IM tips box, and invoke the microblog entrance in response to the operation instruction of the user on the IM tips box.

15. The system of claim 13, wherein the microblog entrance is configured on a tool panel of the IM client and is invoked in response to the operation instruction of the user on the tool panel.

16. The system of claim 13, wherein the microblog data comprises a microblog account for publishing a microblog associated to the IM tips data currently obtained, a content of the microblog and an identifier list of microblogs associated to historical IM tips data having been published; and the IM terminal device presents the microblog account on a user bar of the microblog box, presents the identifier list on a navigation bar of the microblog box, and presents the content of the microblog on a microblog bar of the microblog box; or, the microblog data comprises a microblog account for publishing a microblog associated to the IM tips data currently obtained and a content of the microblog; and the IM terminal device presents the microblog account on a user bar of the microblog box, and presents the content of the microblog on a microblog bar of the microblog box.

17. The system of claim 13, wherein the microblog server is further to store historical IM tips data and microblog data which the historical IM tips data associated to.

18. The system according to claim 13, wherein when the IM tips data is news tips data, the microblog data associated to the IM tips data comprises at least one of: a news ID, a news title, a news description, a picture link, a news link, or a microblog ID corresponding to the news.

* * * * *